United States Patent
Zehler et al.

(10) Patent No.: US 10,841,343 B2
(45) Date of Patent: Nov. 17, 2020

(54) TIME LIMITED DEBUGGING OF SECURE COMMUNICATION SYSTEMS

(71) Applicant: Xerox Corporation, Norwalk, CT (US)

(72) Inventors: Peter J. Zehler, Penfield, NY (US); Lawrence W. Meyer, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 294 days.

(21) Appl. No.: 15/916,574

(22) Filed: Mar. 9, 2018

(65) Prior Publication Data
US 2019/0281089 A1 Sep. 12, 2019

(51) Int. Cl.
*H04L 29/06* (2006.01)
*H04L 9/16* (2006.01)

(52) U.S. Cl.
CPC .............. *H04L 63/205* (2013.01); *H04L 9/16* (2013.01); *H04L 63/105* (2013.01)

(58) Field of Classification Search
CPC ..................................................... H04L 63/205
USPC .......................................................... 726/3
See application file for complete search history.

(56) References Cited

U.S. PATENT DOCUMENTS

| | | | |
|---|---|---|---|
| 7,921,303 B2 | 4/2011 | Mauro, II | |
| 8,549,302 B2* | 10/2013 | Kim | ...................... H04L 9/3273 713/176 |
| 2006/0095965 A1* | 5/2006 | Phillips | ............... H04L 63/1441 726/22 |
| 2007/0127453 A1* | 6/2007 | Shibata | ............. H04L 29/06027 370/356 |
| 2015/0061859 A1* | 3/2015 | Matsuoka | ............ G08B 29/185 340/501 |
| 2015/0150094 A1 | 5/2015 | Foebel et al. | |
| 2016/0021113 A1 | 1/2016 | Burch et al. | |
| 2017/0353368 A1* | 12/2017 | Blocher | .............. H04L 63/0227 |

FOREIGN PATENT DOCUMENTS

CA 2446616 11/2002

* cited by examiner

*Primary Examiner* — Peter C Shaw
(74) *Attorney, Agent, or Firm* — Bell & Manning, LLC (57) ABSTRACT

A system server includes a memory and a processor in communication with the memory. The processor is configured to process a request to lower a security level of one or more communication channels of a secure communication system, where the request is responsive to a problem in the secure communication system. The processor is also configured to generate a message to inform connected devices associated with the one or more communication channels that the security level is to be lowered. The processor is further configured to lower the security level. The processor is further configured to commence a timer to control an amount of time that the security level is to remain lowered.

23 Claims, 4 Drawing Sheets

TIME LIMITED DEBUGGING OF SECURE COMMUNICATION SYSTEMS

TECHNICAL FIELD

The present application describes methods and systems for implementing time limited debugging of secure communication systems.

BACKGROUND

Communication systems often use security techniques to help protect sensitive information included in transmissions, such as personal information, financial information, confidential information, etc. As one example, some communication systems utilize encryption to help protect data. Encryption refers to a process in which communications are encrypted (i.e., encoded) such that only an authorized recipient is able to decrypt the communication and access the underlying content of the communication. An encryption key, which may be public or private, can be used by a sender to encrypt the content of a communication. The recipient is able to decrypt the communication using a private decryption key.

SUMMARY

An illustrative system server in accordance with embodiments described herein includes a memory and a processor in communication with the memory. The processor is configured to process a request to lower a security level of one or more communication channels of a secure communication system, where the request is responsive to a problem in the secure communication system. The processor is also configured to generate a message to inform connected devices associated with the one or more communication channels that the security level is to be lowered. The processor is further configured to lower the security level. The processor is further configured to commence a timer to control an amount of time that the security level is to remain lowered.

An illustrative method in accordance with embodiments described herein includes processing, by a processor of a system server, a request to lower a security level of one or more communication channels of a secure communication system. The request is responsive to a problem in the secure communication system. The method also includes generating, by the processor, a message to inform connected devices associated with the one or more communication channels that the security level is to be lowered. The method also includes lowering the security level by the processor. The method further includes commencing, by the processor, a timer to control an amount of time that the security level is to remain lowered.

Another illustrative system server in accordance with embodiments described herein includes a memory and a processor in communication with the memory. The processor is configured to receive an indication of a problem in a secure communication system. The processor is also configured to process a request to lower a security level of one or more communication channels of a secure communication system, where the request is responsive to the problem in the secure communication system. The processor is also configured to generate a message to inform connected devices associated with the one or more communication channels that the security level is to be lowered. The message includes an amount of time that the security level is to remain lowered. The message also allows a user device to specify whether the user device is to remain connected while the security level is low. The processor is also configured to lower the security level such that communications along the one or more communication channels do not utilize encryption. The processor is also configured to commence a timer to control the amount of time that the security level is to remain lowered. The processor is also configured to receive data for use in troubleshooting the secure communication system while the security level is lowered. The processor is also configured to determine whether the timer has expired. Responsive to a determination that the timer has expired, the processor is further configured to automatically restore the security level of the one or more communication channels to a normal state.

An illustrative printing system includes a print server having a processor and a memory operatively coupled to the processor. The processor of the print server is configured to process a request to lower a security level of one or more communication channels between the print server and one or more of a user device, a printer, and an authentication server. The request is responsive to a problem in the printing system. The processor is also configured to generate a message to inform devices associated with the one or more communication channels that the security level is to be lowered. The processor is also configured to lower the security level and commence a timer to control an amount of time that the security level is to remain lowered Other principal features and advantages of the invention will become apparent to those skilled in the art upon review of the following drawings, the detailed description, and the appended claims.

BRIEF DESCRIPTION OF THE DRAWINGS

Illustrative embodiments will hereafter be described with reference to the accompanying drawings, wherein like numerals denote like elements. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

As discussed above, secure communication systems often incorporate security features to help protect sensitive information that is included in transmissions. Such secure communication systems are typically designed to run continuously with little or no down time due to the often important nature of the communications involved. It is therefore desirable that any problems with the communication system be diagnosed and addressed with minimal down time. One way to diagnose problems in a communication system is to examine the content and metadata associated with the underlying communications in real time. However, in secure communication systems in which encryption is used, such examination of the underling communications involves decryption, which adds time and complexity to the troubleshooting process. Traditional problem diagnosis and resolution also typically involves gathering and analyzing log files and network captures, which often has to be done by an individual with intimate knowledge of the entire system and network.

Described herein are methods and systems that allow for rapid diagnosis and resolution of problems in secure communication systems. The rapid diagnosis and resolution can be performed by less experienced system administrators because of the reduction in complexity afforded by the present methods and systems. In one embodiment, in the event of a problem with the secure communication system, a network administrator is able to temporarily lower the security of one or more point-to-point communication channels in the communication system such that individual communications can be quick analyzed in an effort to diagnose the problem with the communication system. For example, if the secure communication system uses encryption as a form of security, the encryption can be temporarily disabled for one or more communication channels such that the administrator can quickly view and analyze the content of communications without having to utilize a decryption process. Similarly, if the system utilizes hypertext transport protocol secure (HTTPS) for communications, one or more communication channels in the system can be temporarily placed into hypertext transport protocol (HTTP) mode for troubleshooting and analysis. Any entities that will be subjected to lowered security are notified and given an option to continue the communication session with lowered security or to disable the communication session. As discussed herein, the ability to lower the security level for existing connections does not currently exist in traditional systems.

Figure 1:
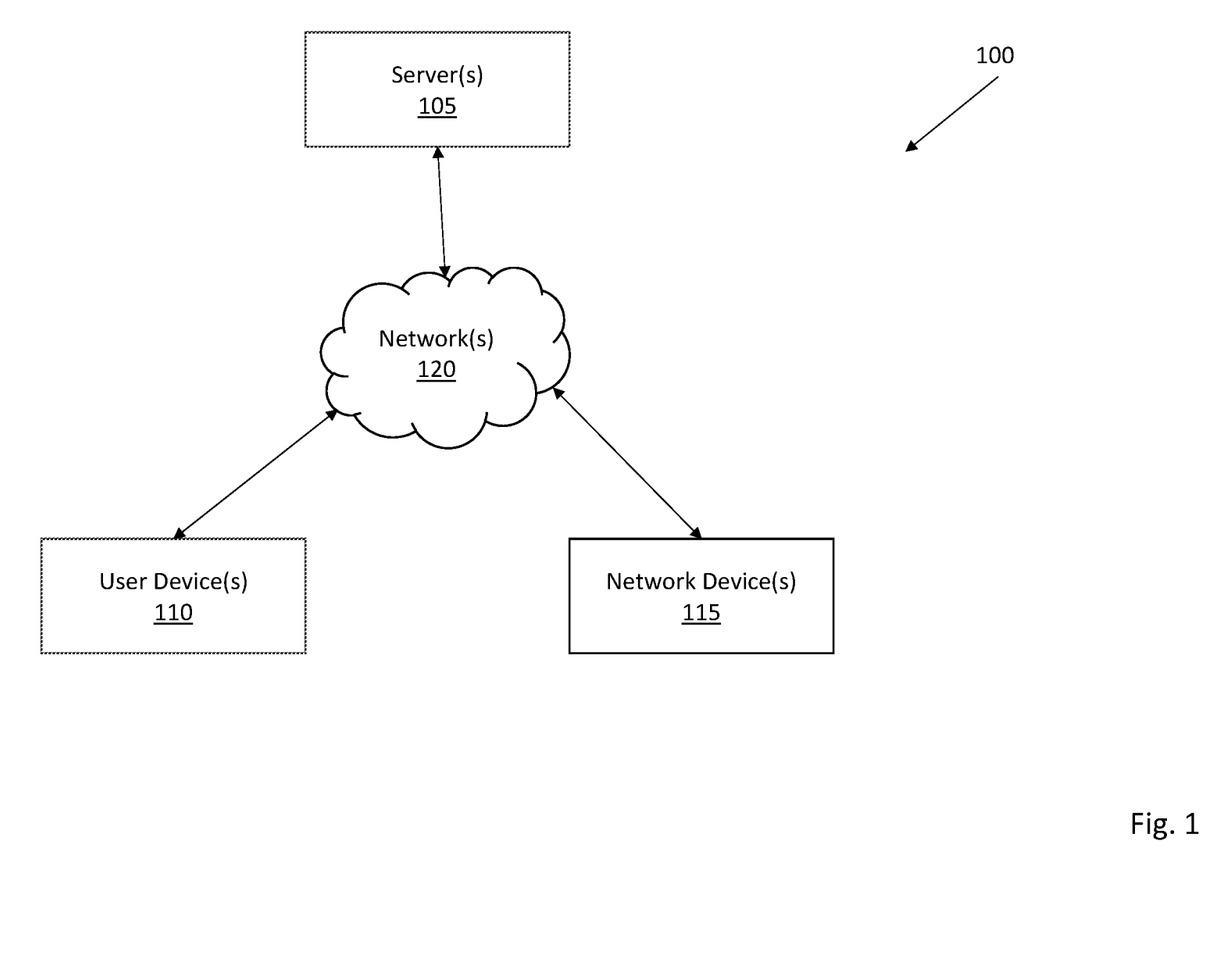
FIG. 1 is a block diagram depicting a secure communication system that utilizes time limited debugging in accordance with an illustrative embodiment.

FIG. 1 is a block diagram depicting a secure communication system that utilizes time limited debugging in accordance with an illustrative embodiment. The secure communication system (or system) 100 includes one or more servers 105, one or more user devices (or clients) 110, and one or more network devices 115. In alternative embodiments, fewer, additional, and/or different components may be included in the system 100. For example, in some embodiments, the system 100 may also include gateways, routers, repeaters, etc.

The components of the system 100 communicate with one another through one or more networks 120. The one or more networks 120 can be any type of wired or wireless communications networks known in the art, including cellular communications networks, fiber optic networks, local area networks (LAN), wide area networks (WAN), short-range communication networks, satellite networks, landline telephone networks, etc.

Each of the one or more servers 105 can include at least a memory, a processor, a transceiver, and an interface. The memory, which can include any type(s) of computer memory or storage component known in the art, can be used to store computer-readable programs and instructions for use in implementing the secure communication system 100. The processor, which can include any type(s) of processor known in the art, can be used to execute the computer-readable programs and instructions stored in the server memory. The server processor also interacts with the transceiver of the server to facilitate receipt and transmission of communications. The server interface can include a touchscreen, mouse, display, speaker, microphone, keyboard, etc. that allows a system administrator to interact with the server. The server processor receives inputs from the interface and takes appropriate action. The components of a system server are described in more detail with reference to FIG. 3.

In an illustrative embodiment, the one or more servers 105 can be used to set up and control the secure communication system 100. For example, the one or more servers 105 can negotiate a security protocol with the one or more user devices 110 such that the user devices 110 can join the system and communicate via the one or more networks 120. A system administrator can access any of the one or more servers 105 either directly or through a remote device to specify operating parameters for the system 100. The administrator can also access any of the one or more servers 105 to perform troubleshooting if any problems arise during use of the system 100. In an illustrative embodiment, the administrator can also use the one or more servers 105 to temporarily reduce the security of the system 100 so that troubleshooting can be performed in real time. This process is described in more detail below with reference to FIG. 2.

Each of the one or more user devices 110 can include a memory, a processor, a transceiver, and an interface. The one or more user devices 110 can be in the form of laptop computers, desktop computers, cellular telephones, tablets, personal digital assistants, and/or any other type of personal communication devices that can be used to access and communicate over a network. The one or more user devices 110 can be used to interact with and control other devices, such as the one or more network devices 115. In some embodiments, a user device can also be used by a system administrator to access and/or communicate with one of the one or more servers 105 to specify system settings, perform troubleshooting, etc. In an illustrative embodiment, the one or more network devices 115 can include one or more networked printers, each of which can include a memory, a processor, a transceiver, and an interface. The one or more network devices 115 can also include smart televisions, fax machines, databases, smart kitchen appliances, gaming systems, Internet of Things (IoT) devices, etc.

Figure 2:
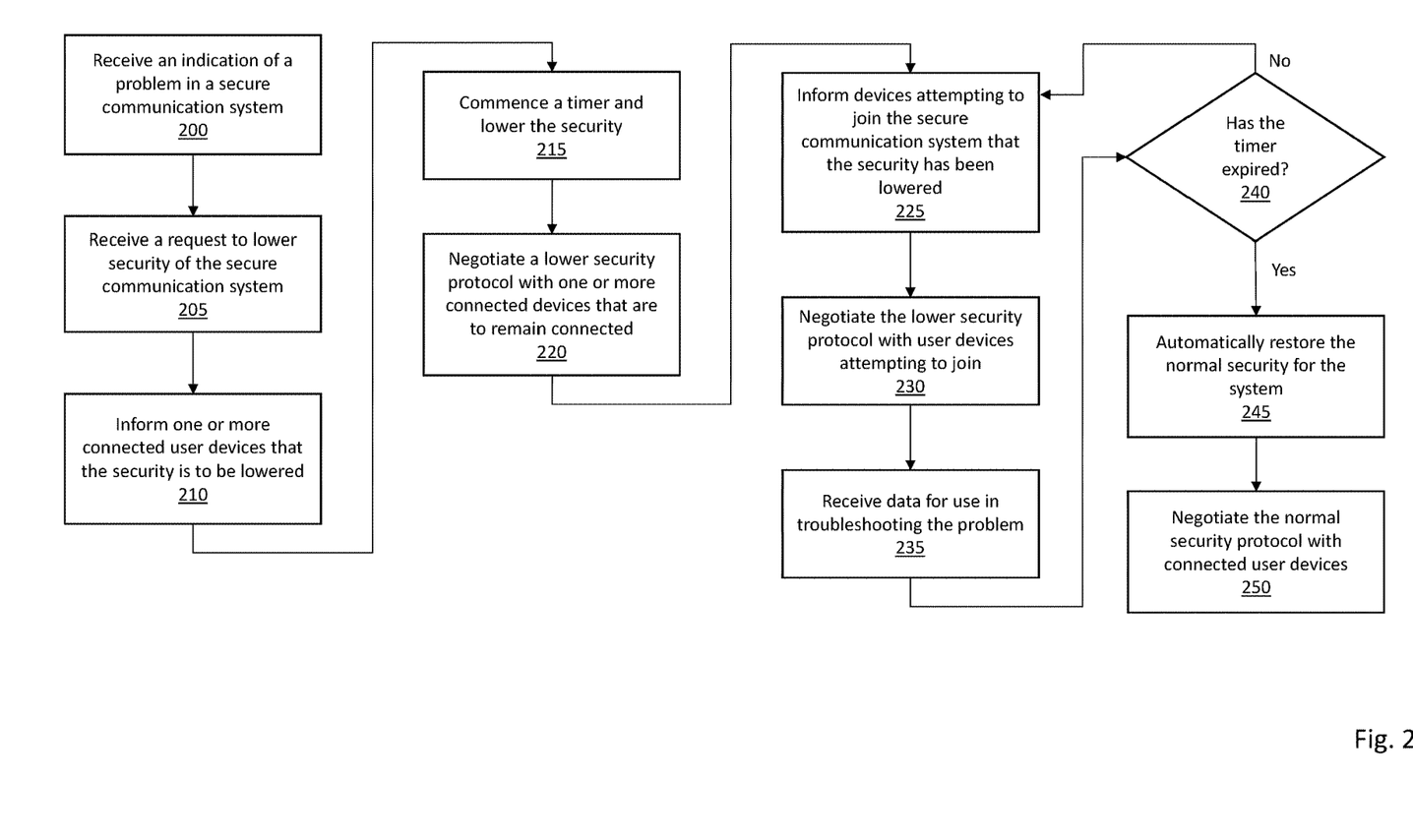
FIG. 2 is a flow diagram depicting operations performed to implement time limited debugging of a secure communication system in accordance with an illustrative embodiment.

FIG. 2 is a flow diagram depicting operations performed to implement time limited debugging of a secure communication system in accordance with an illustrative embodiment. In alternative embodiments, fewer, additional, and/or different operations may be performed. Additionally, the use of a flow diagram is not meant to be limiting with respect to the order of operations performed. In an operation 200, the system receives an indication of a problem in a secure communication system, such as the secure communication system 100 described with reference to FIG. 1. The problem can be increased latency, a communication failure, an inability of user devices to join the system, etc. The indication of the problem can be identified by a system server, by a user device, and/or by a system administrator that is monitoring the system.

A request to lower security of the secure communication system is received in an operation 205. In an illustrative embodiment, the request to lower security is initiated by a system administrator and is received by a system server. The system administrator can initiate the request directly by interacting with an interface of the system server. The system administrator can also initiate the request remotely by interacting with the system server through another device, such as a user device or a different server.

In another illustrative embodiment, the request to lower security is a request to temporarily stop encrypting at least a portion of the transmissions within the system. The request to lower security can also be a request to temporarily utilize HTTP instead of HTTPS. The request to lower security can also be a request to temporarily use an Internet Printing Protocol (IPP) instead of an Internet Printing Protocol Secure (IPPS). As a result of the lowered security, a system administrator is able to view the content and timing of network packets in real time to help with diagnosis and resolution of the problem with the system. Such viewing of the content/timing of network packets in real time is not possible when encryption is being performed because the content of the network packets cannot be readily viewed without the use of a proxy to decode the packets, which alters the timing of the packets and makes troubleshooting more difficult. By lower the security of the system to temporarily stop encryption, standard debugging and troubleshooting techniques can be used and a system administrator can readily determine whether the problem with the system is caused by the secure communication. For example, if the problem in the system is mitigated upon lowering the system security, the system administrator can determine that the security is the root cause of the problem and can then focus troubleshooting on the security aspects of the system such as verifying that security certificates are valid.

In an operation 210, the system informs one or more connected user devices that the security is to be lowered. In an illustrative embodiment, the security is negotiated pairwise between the system and a user device, and only the one or more pairwise connections affected by the lowered security are notified in the operation 210. Alternatively, security of the entire system may be lowered, in which case all connected user devices are notified. The system can similarly inform other network devices connected to the system that the security is to be lowered. The system can also inform connected devices of the amount of time for which the security is to be lowered. In one embodiment, the system can generate and send a message to all connected devices that are to be affected with an indication that the security level is to be temporarily lowered, and give users the option of utilizing the system with the lowered security level or ending their session. The message can include a signature to establish the validity of the system server from which the message originates. In an alternative embodiment, users may indicate in advance whether they wish to continue using the system in the event of a lowered security level. In such an embodiment, the system may not send a message to the user devices to inform them of the lowered security level because the user has already indicated whether he/she is willing to continue using the system under such conditions.

In an operation 215, the system commences a timer and lowers the security of the system. In an illustrative embodiment, the timer can be for a predetermined amount of time, such as a number of seconds or minutes. For example, the timer can be set for 20 seconds, 30 seconds, 40 seconds, 1 minute, 2 minutes, 5 minutes, etc. Alternatively, other values may be used. In one embodiment, a system administrator can specify the amount of the timer on a case-by-case basis. In such an embodiment, the system administrator may have to make a timer selection from a predetermined range of possible values, such as 30 seconds to 5 minutes. In another alternative embodiment, the timer value may be randomly or otherwise determined by the system. As discussed in more detail below, the system automatically reverts to the original (higher) security upon expiration of the timer.

The system negotiates a lower security protocol with one or more connected devices that are to remain connected to the system in an operation 220. Specifically, if the user opts to continue utilizing the system (either in response to a request or based on a prior indication), a network layer of the system re-negotiates with the user device of the user to establish a communication protocol in which encryption does not occur. In one embodiment, the ability of the system to re-negotiate the lower security is implemented through an extension of the existing (i.e., normal security) communication protocol. In alternative embodiments, the security level may be lowered using any other techniques known in the art.

It is possible that other users will attempt to join the system while the system is operating in the lower security mode. In an operation 225, the system informs devices attempting to join the secure communication system that the security has been lowered. The process of informing user devices attempting to join the system of the lower security can be similar to or the same as the process described in the operation 210 for informing connected users whose connections are going to be affected by the lowered security. In one embodiment, users attempting to join the system can be provided with a message on their user device that informs the user of the lowered security and asks whether the user still wishes to join the system. The message can also indicate an amount of time which the security will remain lowered based on a current timer value. Alternatively, such a message may not be sent if the user has previously indicated whether or not they wish to join the system in the event that the system is operating with lowered security.

In an operation 230, the system negotiates the lower security protocol with devices attempting to join the system. In an illustrative embodiment, the negotiation can be similar to or the same as the negotiation described with reference to the operation 220. Specifically, if the user indicates a desire to join the system with lowered security, a network layer of the system negotiates with the user device of the user to establish a communication protocol in which encryption does not occur, or in which the security is otherwise lowered. As discussed above, the ability of the system to re-negotiate the lower security can be implemented through an extension of the existing communication protocol. In an alternative embodiment, the system may only lower the security level of one or more communication channels with already connected devices such that the normal security level will be negotiated with any devices attempting to newly join the system. In such an embodiment, the operations 225 and 230 are not performed.

In an operation 235, the system receives data for use in troubleshooting the problem identified in the operation 200. In one embodiment, the received data can include network traces and/or a timeline that depicts timestamps associated with data packets transmitted within the system. For example, the timeline can include a timestamp for when a packet was sent by a user device, a server, or another networked device, a timestamp for when the packet was received by the user device, the server, or the networked device, and/or a timestamp when the packet was forwarded by a network entity such as a gateway or router. A system administrator and/or a system server can use the timeline to identify transmissions with high latency, which can help inform both diagnosis and resolution of the underlying problem. The data analyzed by the system can also include the content of data packets transmitted within the system. The system administrator and/or server can analyze the contents in accordance with standard debugging techniques.

For example, the lowered security allows the use of standard tools such as network analyzers, and does not require integration of monitors into the system. Using standard tools allows for real time analysis of a number of network communications, including their relative timing.

In one embodiment, the data received in the operation 235 can include at least in part information regarding transmissions between a user device under the control of a system administrator and a system server. In such an implementation, the system administrator can directly control the transmissions between the user device and the system server, and can view in real time the underlying data associated with those transactions, such as packet timing and contents. As a result, standard network transmissions are used, and there is no need to generate debug content for transmission within the system. Insertion of such debug content into the system can modify system behavior and obscure the problem(s) in the system. In an illustrative embodiment, the data from the standard network transmissions is utilized in real time to identify and resolve the underlying problem with the system. The data associated with the standard network transmissions can also be stored in a computer memory for later review by the system administrator and/or the system server.

As an example, a system administrator may determine that lowering the security for the system did not resolve or affect the problem in the system. In such a situation, the administrator can determine that the problem is not related to the removed security aspect and can proceed to troubleshoot other areas of the system. Similarly, the administrator may determine that lowering the security for the system did resolve or affect the problem, and can then focus on what portion of the security is causing the issue. This allows a lesser trained administrator (i.e., one who does not have complete intimate knowledge of the system and network) to quickly diagnose and solve at least some of the problems that the system may encounter.

In an operation 240, the system makes a determination of whether the timer has expired. If it is determined that the timer has not expired, the system remains in the lower security mode and the system continues to implement the operations 225, 230, 235, and 240 until it is determined that the timer has expired. Upon expiration of the timer, the system automatically restores the normal security for the system in an operation 245. In an illustrative embodiment, the system restores the normal security by again ensuring that all communications within the system are encrypted going forward, or that the security is otherwise raised back to its original state. In one embodiment, the lowered security mode can be manually terminated by a system administrator at any point prior to expiration of the timer. For example, the system administrator may solve the system problem while there is still 2 minutes remaining on the timer. In such a situation, the administrator can manually cause the security to revert to its original state to reduce the amount of time that the system is in lower security mode. In an operation 250, the system negotiates the normal security protocol with all of the connected user devices (and any other networked devices) such that encryption or other heightened security occurs moving forward.

Figure 3:
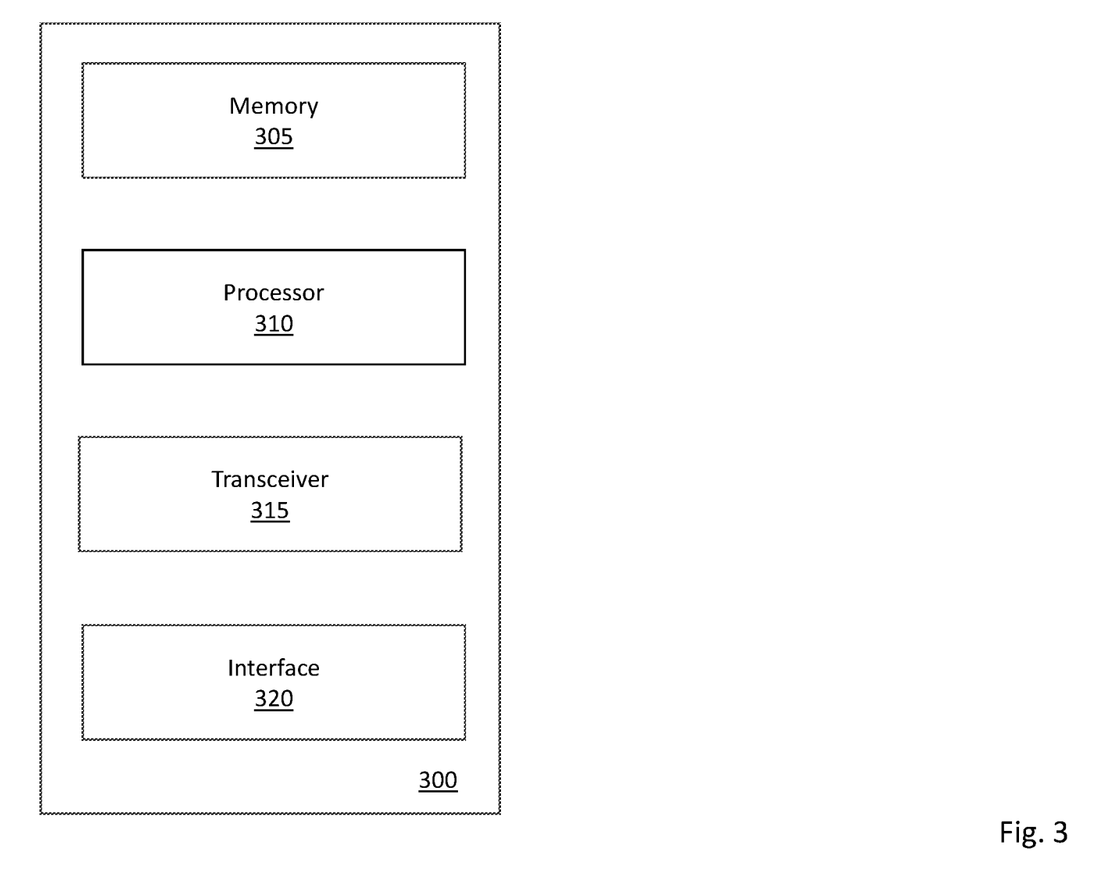
FIG. 3 is a block diagram depicting a system server in accordance with an illustrative embodiment.

FIG. 3 is a block diagram depicting a system server 300 in accordance with an illustrative embodiment. The system server 300 can be used to perform any of the operations described herein. The system server 300 includes a memory 305, a processor 310, a transceiver 315, and an interface 320. In alternative embodiments, the system server 300 can include fewer, additional, and/or different components.

The memory 305 can be used to store any algorithms, programs, etc. to implement the operations described herein. The memory 305 can include one or more computer memories which can be distributed or at a single location, and can be any type(s) of computer memory known in the art. In one embodiment, the memory 305 can be used to store an algorithm for implementing lowered security as described herein. Specifically, the memory 305 can be used to store computer-readable instructions to implement problem identification, message transmissions related to lowered security, negotiation of a lowered security protocol, generation of data for use in troubleshooting, etc. The processor 310 can include one or more processors which can be distributed or at a single location, and can be any type(s) of processor known in the art. In an illustrative embodiment, the processor 310 can be used to execute any programs, algorithms, computer-readable instructions, etc. stored in the memory 305 or otherwise accessible to the system server 300. The processor 310 can also be used to control the transceiver 315 and/or to process inputs received through the interface 320.

The transceiver 315 can include any type of receiver and any type of transmitter known in the art. The transceiver 315 can be used to communicate with user devices, other networked devices, and other system servers. The interface 320 allows a system administrator to interact with the system and input data/requests into the system. The interface 320 can include a touch screen, a mouse, a keyboard, speaker, microphone, display, etc.

Figure 4:
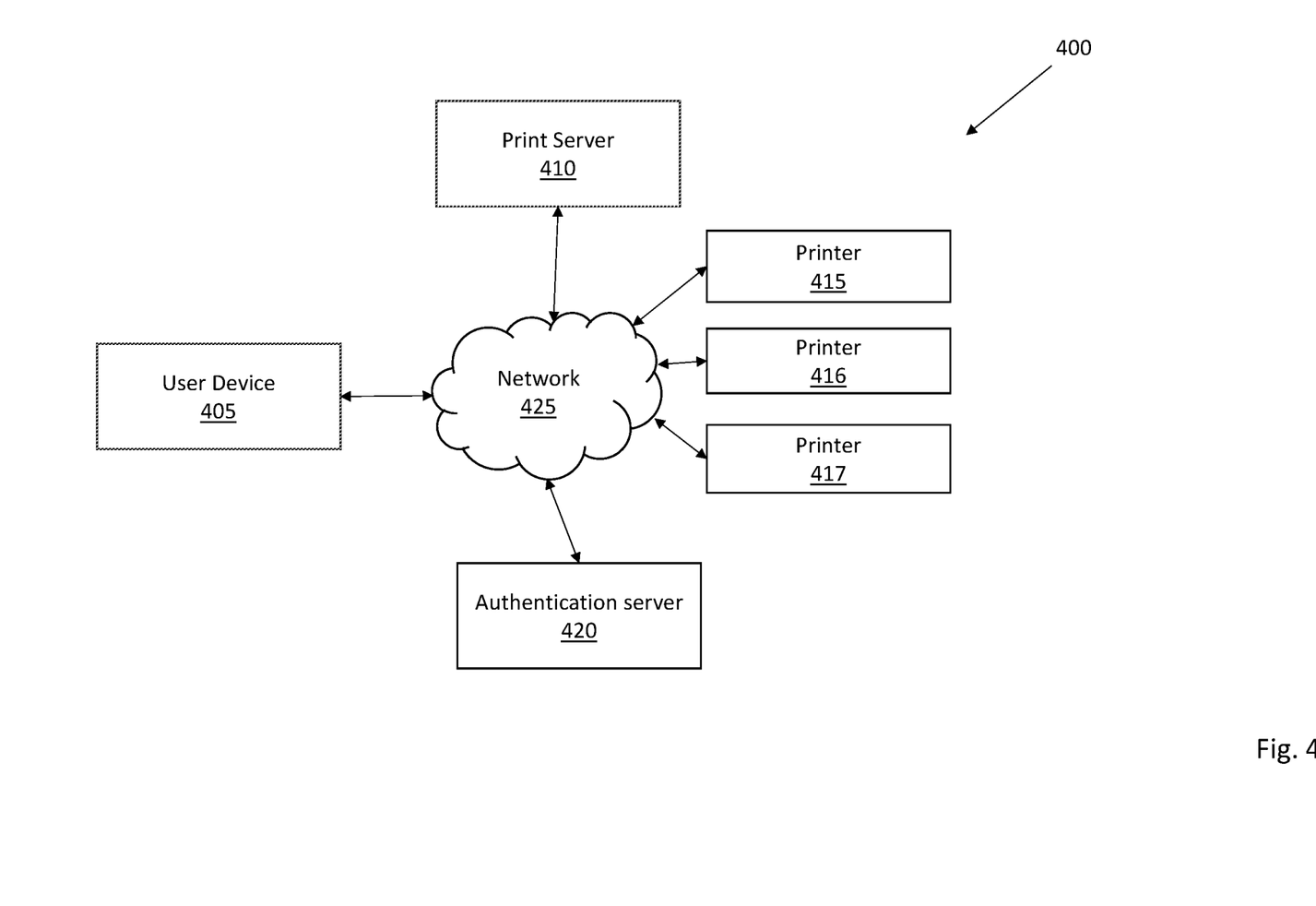
FIG. 4 is a block diagram depicting a printing system in accordance with an illustrative embodiment.

FIG. 4 is a block diagram depicting a printing system 400 in accordance with an illustrative embodiment. The printing system 400 includes a user device 405, a print server 410, printers 415-417, and an authentication server 420. In alternative embodiments, fewer, additional, and/or different components may be included in the printing system 400. For example, the printing system may include numerous user devices and any number of printers. In an illustrative embodiment, each of the components in the printing system 400 communicates via a network 425. The network 425 can be any type of wireless or wired network known in the art. Any of the components of the printing system 400 can also communicate with one another by way of a direction connection between components. Additionally, each of the printing system 400 components can include one or more processors, one or more memories, one or more transceivers, and/or one or more interfaces.

In an illustrative embodiment, a user can utilize the user device 405 to originate a print job. The user device 405 can be a laptop computer, desktop computer, tablet, cellular telephone, etc. The print job can include information regarding the user's identity and one or more documents or other items that the user wishes to print. The originated print job can be transmitted from the user device 405 to the print server 410, where the print job is stored in a queue until the user of the user device 405 prints it using one of the printers 415-417.

In an illustrative embodiment, the user can identify a printer on which to execute the print job, and can provide authentication data to the printer to verify the user's identity. For example, the user can approach the printer 415 and enter his/her authentication data through an interface of the printer 415. The authentication data can be a password, a username, a bar code, biometric data, near-field communication data, etc. Upon receipt of the authentication data, the printer 415 authenticates the user through the authentication server 420 using any techniques known in the art. The printer 415 can interact directly with the authentication server 420 to perform the authentication, or alternatively the printer 415 can interact indirectly with the authentication server 420 via the printer server 410. Once the user is authenticated, the printer 415 receives the print job from the print server 410 and executes the print job.

Thus, the printing system 400 involves communications between the various components such that a user is able to complete a print job at a printer of his/her convenience. In an illustrative embodiment, communications within the printing system 400 can be secure communications which are typically encrypted or otherwise protected. In the event of an identified problem within the printing system 400, the methods and systems described herein can be used to lower the security on one or more communication channels within the printing system 400 such that troubleshooting can be performed.

For example, the security level of the communication channel between the user device 405 and the print server 410 may be lowered, the security level of the communication channel between the printer 415 and the authentication server 420 may be lowered, the security level of the communication channel between the print server 410 and the authentication server 420 can be lowered, and/or the security level of the communication channel between the printer 415 and the print server 410 may be lowered in response to an identified problem within the printing system 400. A timer can also be started to control the amount of time that the communication channel(s) in the printing system 400 have lowered security, and users can be provided with an option of remaining in the system with lowered security or opting out. The printing system 400 can also receive data for use in troubleshooting the problem by analyzing transmissions sent along the one or more communication channels with lowered security. Once the timer expires, the printing system 400 automatically restores the normal security level to all communication channels. These operations can be initiated by a system administrator and can be performed by the print server 410 in accordance with an illustrative embodiment. Alternatively, the operations can be performed by any of the user device 405, the print server 410, the printers 415-417, or the authentication server 420, alone or in combination with one another.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system server comprising:
   a memory; and
   a processor in communication with the memory, wherein the processor is configured to:
   process a request to lower a security level of one or more communication channels of a secure communication system, wherein the request is responsive to a problem in the secure communication system;
   generate a message to inform connected devices associated with the one or more communication channels that the security level is to be lowered, wherein the message includes an amount of time that the security level is to remain lowered;
   lower the security level; and
   commence a timer to control the amount of time that the security level is to remain lowered.

2. The system server of claim 1, wherein the processor ceases message encryption in the secure communication system to lower the security level.

3. The system server of claim 1, wherein the message allows a user device to specify whether the user device is to remain connected while the security level is low.

4. The system server of claim 3, wherein, responsive to an indication that the user device is to remain connected, the processor is configured to negotiate a lower security protocol with the user device.

5. The system server of claim 1, wherein the processor is configured to determine whether the timer has expired.

6. The system server of claim 5, wherein, responsive to a determination that the timer has expired, the processor is configured to automatically restore the security level of the one or more communication channels to a normal state.

7. The system server of claim 6, wherein, to restore the security level to the normal state, the processor is configured to negotiate a normal security protocol with devices whose security level was lowered.

8. The system server of claim 1, wherein the processor is configured to receive data for use in troubleshooting the secure communication system while the security level is lowered.

9. The system server of claim 8, wherein the received data includes at least one of a packet timeline, a network trace, and packet contents.

10. The system server of claim 1, wherein the processor is further configured to receive an indication of the problem in the secure communication system.

11. The system server of claim 10, wherein the indication of the problem is received from one of a user device, a network device, or another system server.

12. The system server of claim 1, wherein the processor causes the secure communication system to utilize hypertext transport protocol (HTTP) instead of hypertext transport protocol secure (HTTPS) to lower the security level.

13. The system server of claim 1, wherein the message includes a signature to establish validity of the system server.

14. A method comprising:
    processing, by a processor of a system server, a request to lower a security level of one or more communication channels of a secure communication system, wherein the request is responsive to a problem in the secure communication system;
    generating, by the processor, a message to inform connected devices associated with the one or more communication channels that the security level is to be lowered, wherein the message includes an amount of time that the security level is to remain lowered;
    lowering the security level by the processor; and
    commencing, by the processor, a timer to control the amount of time that the security level is to remain lowered.

15. The method of claim 14, further comprising receiving, by the processor, data for use in troubleshooting the secure communication system while the security level is lowered.

16. The method of claim 14, further comprising:
determining, by the processor, whether the timer has expired; and
responsive to a determination that the timer has expired, automatically restoring, by the processor, the security level of the one or more communication channels to a normal state.

17. The method of claim 14, wherein lowering the security level comprises temporarily removing a requirement that communications along the one or more communication channels be encrypted.

18. A system server comprising:
a memory; and
a processor in communication with the memory, wherein the processor is configured to:
receive an indication of a problem in a secure communication system;
process a request to lower a security level of one or more communication channels of a secure communication system, wherein the request is responsive to the problem in the secure communication system;
generate a message to inform connected devices associated with the one or more communication channels that the security level is to be lowered, wherein the message includes an amount of time that the security level is to remain lowered, and wherein the message allows a user device to specify whether the user device is to remain connected while the security level is low;
lower the security level such that communications along the one or more communication channels do not utilize encryption;
commence a timer to control the amount of time that the security level is to remain lowered;
receive data for use in troubleshooting the secure communication system while the security level is lowered;
determine whether the timer has expired; and
responsive to a determination that the timer has expired, automatically restore the security level of the one or more communication channels to a normal state.

19. The system server of claim 18, wherein, responsive to an indication that the user device is to remain connected, the processor is configured to negotiate a lower security protocol with the user device.

20. A printing system comprising:
a print server including a processor and a memory operatively coupled to the processor, wherein the processor of the print server is configured to:
process a request to lower a security level of one or more communication channels between the print server and one or more of a user device, a printer, and an authentication server, wherein the request is responsive to a problem in the printing system;
generate a message to inform devices associated with the one or more communication channels that the security level is to be lowered, wherein the message includes an amount of time that the security level is to remain lowered;
lower the security level; and
commence a timer to control the amount of time that the security level is to remain lowered.

21. The printing system of claim 20, wherein responsive to a determination that the timer has expired, the processor is configured to automatically restore the security level of the one or more communication channels to a normal state.

22. The printing system of claim 21, wherein to restore the security level to the normal state, the processor is configured to negotiate a normal security protocol with devices whose security level was lowered.

23. The printing system of claim 20, wherein the processor causes the secure communication system to utilize Internet Printing Protocol (IPP) instead of Internet Printing Protocol Secure (IPPS) to lower the security level.

* * * * *